Feb. 16, 1954

N. F. SCHILLING 2,669,375

DRESS DISPLAY FORM

Filed Feb. 14, 1951

INVENTOR.
NATHAN F. SCHILLING
BY
Zoltan Holachek
ATTORNEY

Feb. 16, 1954 — N. F. SCHILLING — 2,669,375
DRESS DISPLAY FORM
Filed Feb. 14, 1951 — 3 Sheets-Sheet 2
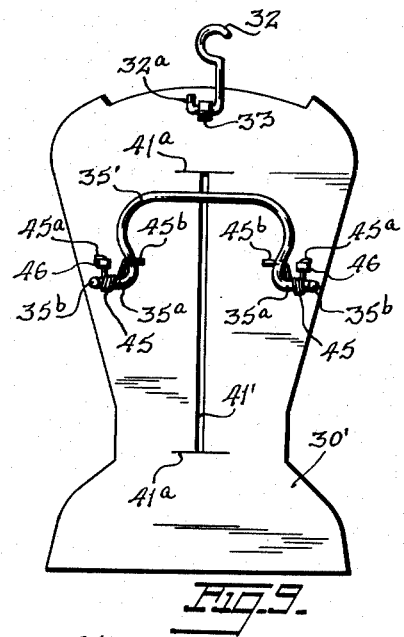
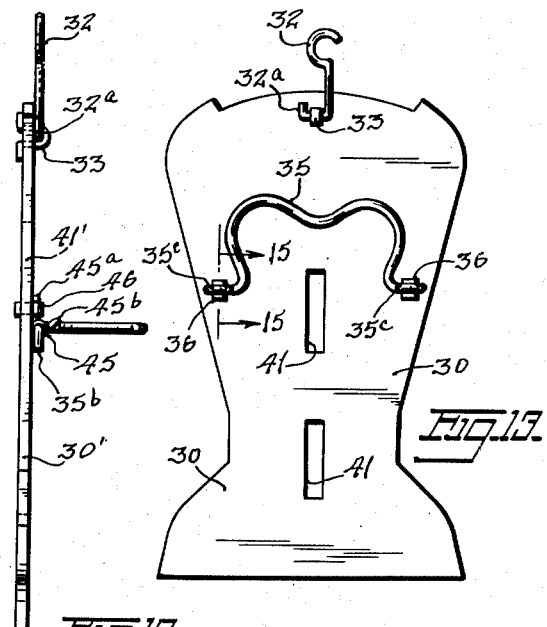
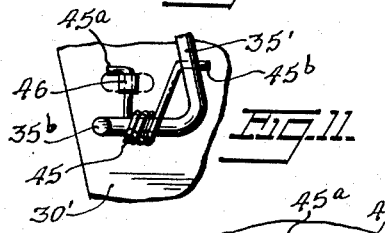
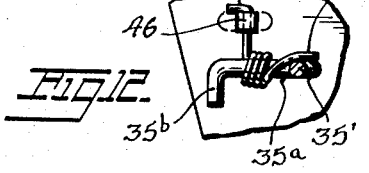
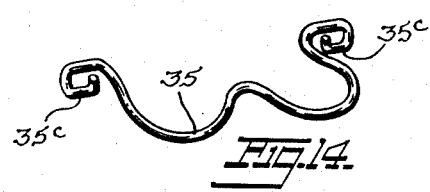
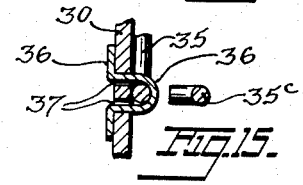
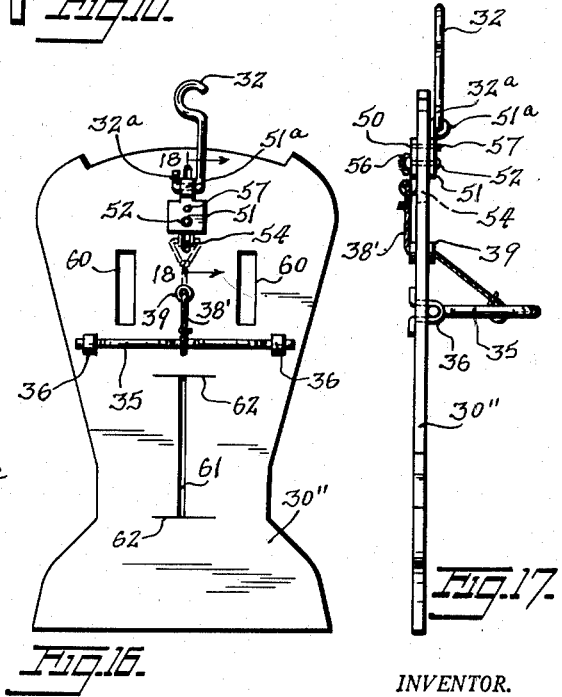
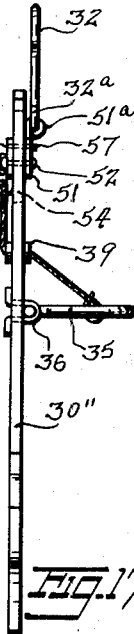
INVENTOR.
NATHAN F. SCHILLING
BY
ATTORNEY

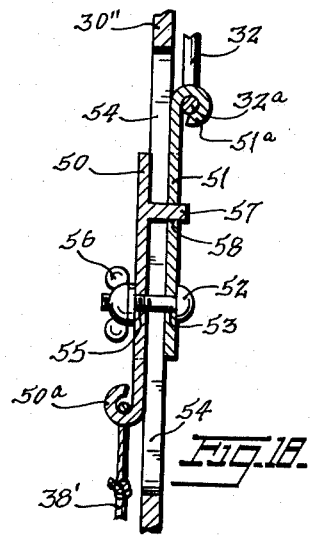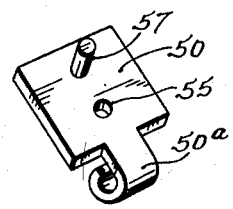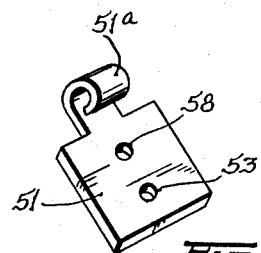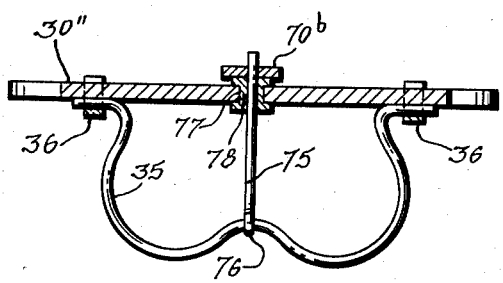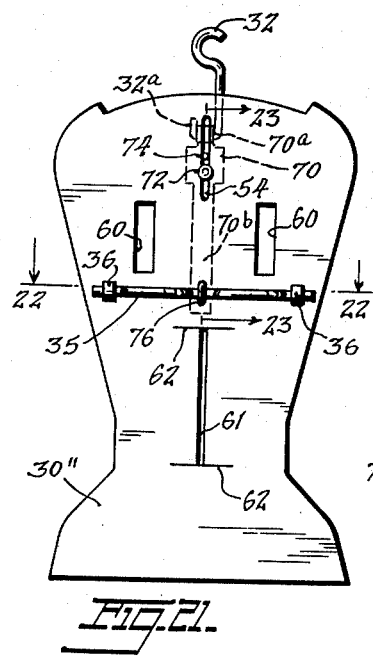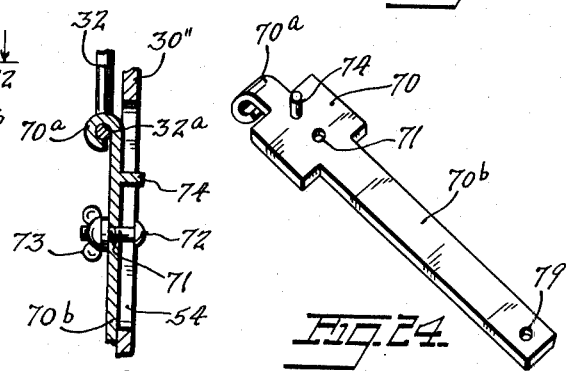

Patented Feb. 16, 1954

2,669,375

UNITED STATES PATENT OFFICE 2,669,375

DRESS DISPLAY FORM

Nathan F. Schilling, Brooklyn, N. Y.

Application February 14, 1951, Serial No. 210,970

14 Claims. (Cl. 223—68)

This invention relates to new and useful improvements in dress display forms.

More specifically, the present invention relates to the construction of dress display forms of a type generally used for displaying dresses, wrap-around aprons, sweaters and similar articles of feminine attire which includes as an integral part thereof means for shaping the bust area of the garment supported thereon.

A further object of the present invention proposes the construction of a dress display form having a flat body shaped to the general outline of the shoulders, chest and waist area of the garments and which has a bust wire pivotally mounted on the front thereof in a manner to extend horizontally from the front of the body to shape the bust area of the garment supported on the body.

Still another object of the present invention proposes forming the flat body to include means such as a pivotally mounted hook which is extendable above the top edge of the body in a manner to support the flat body in a vertical position with the garment in position thereon.

Another object of the present invention proposes forming the bust wire to be M-shaped or U-shaped in outline in accordance with the amount of shaping desired in the bust area of the garment.

Still further, the present invention proposes several different ways of pivotally mounting the bust wires in position on the flat body and for holding the wire in the desired position extended horizontally from the flat body to obtain the desired shape in the garment.

The present invention further proposes a novel interconnection between the means for suspending the flat body and the pivotally mounted bust wire so that vertical adjustments of the suspending means will vary the angular disposition of the bust wire with relation to the flat body to vary the effect of the bust wire in shaping the bust area of the garment positioned on the flat body.

It is a further object of the present invention to provide dress display forms which are simple and durable, which are effective for their intended purposes and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawings forming a material part of the present disclosure:

Fig. 9 is a front elevational view similar to Fig. 4, but illustrating the dress display form constructed in accordance with a modification of the present invention.

Fig. 10 is a side elevational view of Fig. 9, but with the bust wire pivoted to a lowered position.

Fig. 11 is an enlarged detailed view of a portion of Fig. 9.

Fig. 12 is a view similar to Fig. 11, but with the bust wire pivoted to a lowered position.

Fig. 13 is another view similar to Fig. 4, but illustrating the dress display form constructed in accordance with a still further modification of the present invention.

Fig. 14 is a perspective view, per se, of the bust wire used in the form of the invention shown in Fig. 13.

Fig. 15 is an enlarged partial vertical sectional view taken on the line 15—15 of Fig. 13.

Fig. 16 is still another front elevational view similar to Fig. 4, but illustrating the dress display form constructed in accordance with another modification of the present invention.

Fig. 17 is a side elevational view of Fig. 16.

Fig. 18 is an enlarged partial vertical sectional view taken on the line 18—18 of Fig. 16.

Fig. 19 is a perspective view of one of the plate members used in the form of the invention illustrated in Figs. 16 to 18.

Fig. 20 is a perspective view of the other of the plate members used in the form of the invention illustrated in Figs. 16 to 18.

Fig. 21 is still another view similar to Fig. 4, but illustrating the dress display form constructed in accordance with a still further modification of the present invention.

Fig. 22 is an enlarged horizontal sectional view taken on the line 22—22 of Fig. 21.

Fig. 23 is an enlarged partial vertical sectional view taken on the line 23—23 of Fig. 21.

Fig. 24 is a perspective view of the metal plate used in the form of the invention illustrated in Figs. 21 to 23.

The dress display form, according to the form of the invention shown in Figs. 1 to 8, includes a flat body 30 formed of a thin sheet of heavy cardboard, wood, synthetic resin or plastic, metal or any other similar material. The flat body is outlined to conform to the shape of the shoulder, chest, hip and waist areas of the female body, as clearly seen from Figs. 1, 2 and 4.

Figure 1:
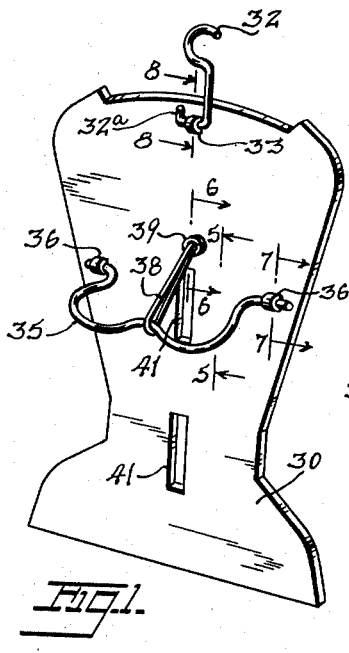
Fig. 1 is a perspective view of a dress display form constructed in accordance with the present invention.
Figure 2:
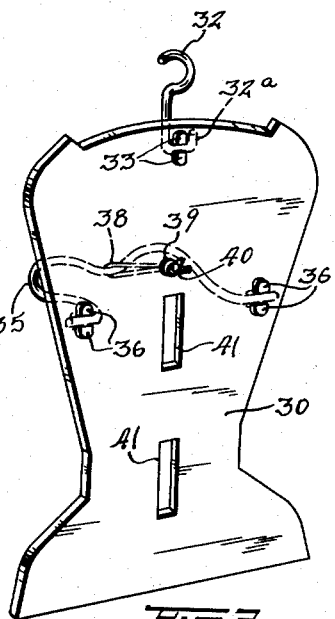
Fig. 2 is a perspective view looking from the rear side of Fig. 1.
Figure 3:
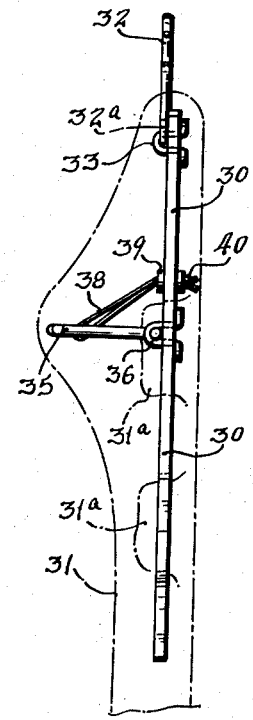
Fig. 3 is a side elevational view of Fig. 1 with the position of a dress indicated in dot and dash lines.
Figure 4:
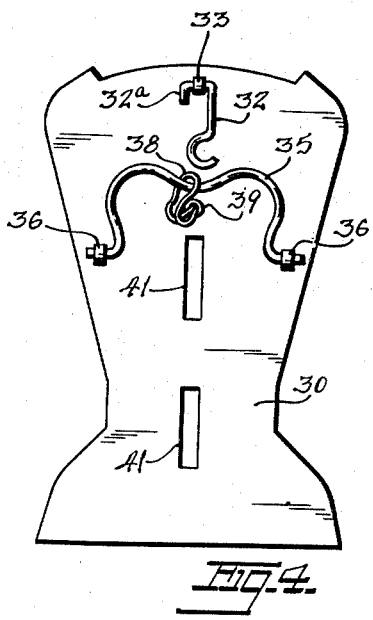
Fig. 4 is a front elevational view of Fig. 1, but with the top hook lowered to an inoperative position and the bust wire raised to an inoperative position.

Means is provided for supporting the flat body in a vertical position to have a dress 31 suspended therefrom, as shown by the dot and dash lines in Fig. 3. The supporting means comprises a hook 32 bent from a length of relatively stiff wire. The bottom of the hook 32 is formed with a right angularly bent portion 32ᵃ by which the hook is pivotally mounted on the flat body 30 at the top thereof by means of a U-shaped metal clip 33. The free ends of the side arms of the clip 33 are passed through spaced holes 34 formed in the flat body 30, see Fig. 8, and then bent upward and downward along the rear face of the body securely anchoring the hook 32 in position on the body. The clip 33 leaves the hook 32 free to be pivoted between an operative position extended upward from the flat body 30, as shown in Figs. 1 to 3, and an inoperative position depended along the front face of the flat body 30, as shown in Fig. 4.

A bust wire 35 is pivotally mounted in a horizontal position on the front face of the flat body 30 in the chest area thereof. The bust wire 35 is M-shaped in plan to conform to the lateral cross-sectional shape of female body and so impart a similar natural curvature to the dress 31 suspended on the form. The ends of the side arms of the bust wire 35 are bent outward and pivotally mounted upon the flat body 30 by U-shaped clips 36. The free ends of the clips 36 are passed through spaced holes 37, see Fig. 7, formed in the body and then bent upward and downward along the rear face of the flat body.

Means is provided in connection with the bust wire 35 for supporting it in the desired position extended horizontally from the flat body 30. The means comprises a band 38 which is passed about the bust wire 35 and which has its free ends extended through a grommet 39 mounted through the flat body above the pivotally mounted ends of the bust wire 35. The free ends of the band 38 after being passed through the grommet 39 are tied into a knot 40, see particularly Figs. 2, 3, 5 and 6. The angular disposition of the bust wire 35 can be changed by pulling the band 38 further through the grommet 39 and then changing the position of the knot 40 to either raise or lower the position of the bust wire 35 as may be required.

The band 38 is preferably made of elastic material so that the bust wire 35 will be resiliently supported in the desired horizontal position to give slightly when touched and impart a more natural feel to the dress when touched in the bust area.

Figure 5:
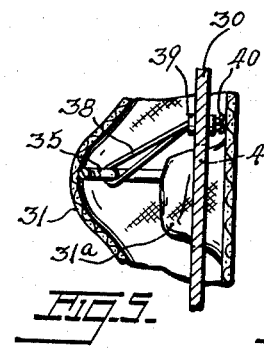
Fig. 5 is an enlarged partial vertical sectional view taken on the line 5—5 of Fig. 1, but with a portion of a dress in position on the display form.
Figure 6:
Fig. 6 is an enlarged partial vertical sectional view taken on the line 6—6 of Fig. 1.
Figure 7:
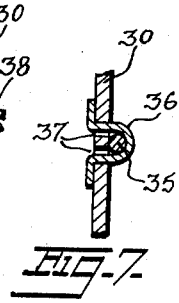
Fig. 7 is an enlarged partial vertical sectional view taken on the line 7—7 of Fig. 1.
Figure 8:
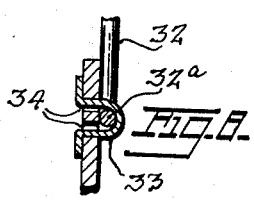
Fig. 8 is an enlarged partial vertical sectional view taken on the line 8—8 of Fig. 1.

The vertical center of the flat body is formed with several spaced vertically extended slots 41 into which the suspended dress 31 can be drawn as indicated at 31ᵃ in Fig. 5, for drawing the garment tightly into position about the side edges of the flat body 30. It is appreciated, of course, that such positioning will also serve to draw the chest area of the dress into conformity with the shape of the horizontally supported bust wire 35.

The manner of using the dress display form is as follows:

The bust wire 35 is lowered to its horizontal position and the dress 31 is slipped over the top of the flat body 30 with the hook 32 extending through the neck opening of the dress. Adjustment of the bust wire 35 is accomplished by varying the position of the knot 40 in the band 38 to obtain the desired shaping of the bust area of the dress. When the bust wire 35 is adjusted as desired, the rear portions of the dress are pushed into the slots 41 drawing the dress into position about the sides of the flat body 30 and over the front of the bust wire. The flat body is then suspended in a vertical position by means of the hook 32 to display the dress mounted thereon.

When the dress form is to be packaged for shipping or stored when not in use, the hook 32 can be folded down against the front face of the flat body 30 and the bust wire 35 can be folded upward against the flat body, as shown in Fig. 4.

In the modification of the invention shown in Figs. 9 to 12, the dress display form includes a flat body 30' upon which a bust wire 35' is pivotally supported. As shown in Fig. 9, the bust wire 35' is substantially U-shaped in outline and has the free end portions 35ᵃ of its side arms bent to extend outward along the front face of the flat body 30'. The end portions 35ᵃ in turn continue into lug portions 35ᵇ which extend at right angles to the plane of the bust wire 35'.

The end portions 35ᵃ of the bust wire 35' are rotatively supported in coil springs 45 which have one of their ends secured to the flat body 30' by means of U-shaped clips 46. The ends of springs 45 engaged by the clips 46 have right angular bent end portions 45ᵃ for retaining those ends from slipping downward out of the clips 46. The other ends 45ᵇ of the coil springs 45 are engaged behind the side arms of the bust wire 35'. Thus, the springs 45 exert a force turning the bust wire 35' into a forwardly extended horizontal position, as shown in Figs. 10 and 12. In that position, the lug portions 35ᵇ of the bust wire 35' engage the front face of the flat body 30' and limit the action of the springs 45 in turning the bust wire downward.

The modification of the invention is further characterized by the fact that the vertical center of the flat body 30' is formed with a single vertically extended slot 41', see Fig. 9.

The flat body 30' at the ends of the slot 41' is formed with slits 41ᵃ which extend laterally in opposite directions from the ends of the slot 41'. The slits 41ᵃ render the material of the flat body 30 on opposite sides of the slot 41' more flexible so that the material of the flat body 30 will spread to facilitate the insertion of the dress material when the dress is being positioned on the flat body.

In other respects the modification of the invention illustrated in Figs. 9 to 12 is similar to that illustrated in Figs. 1 to 8 and like reference numerals are used throughout to identify like parts.

The modification of the invention illustrated in Figs. 13 to 15 is also similar to that illustrated in Figs. 1 to 8 differing only in the means for retaining the bust wire 35 in a forwardly pivoted horizontal position. The bust wire 35 is M-shaped and after being passed through the clips 36, the ends of the side arms of the bust wire are bent into U-shaped lug portions 35°. Those lug portions 35° extend at right angles to the plane of the bust wire 35 and when that bust wire is pivoted to a horizontal position, the lug portions 35° strike the front face of the flat body 30 and limit further downward pivoting of the bust wire. Thus, the bust wire 35 is supported in the desired forwardly extended horizontal position to shape the bust area of the garment positioned on the dress form.

In other respects, the form of the invention shown in Figs. 13 to 15 is similar to that illustrated in connection with Figs. 1 to 8 and like reference numerals identify like parts in all of the views.

The modification of the invention illustrated in Figs. 16 to 20 is characterized by a manually adjustable means for holding the M-shaped bust wire 35 in desired adjusted positions on the flat body 30". The bust wire 35 is pivotally supported on the flat body 30" in the same manner as that described in connection with Figs. 1 to 8.

The adjustment means comprises a pair of plates 50 and 51 which are illustrated in detail in Figs. 19 and 20 and which are formed of metal, synthetic resin or plastic material or any other similar material. The plate 50 is positioned against the rear face of the flat body 30" and is formed with a depending eye portion 50ª. The plate 51 is positioned against the front face of the flat body 30" and is formed with an upstanding eye portion 51ª. The hook 32 has its right angularly bent portion 32ª engaged in the eye portion 51ª of the plate 51, so that vertical adjustments of the plate 51 will adjust the hook 32 vertically relative to the flat body 30".

Means is provided for connecting the plates 50 and 51 together for unitary movement so that as the position of the plate 51 is adjusted vertically, by pressures applied through the hook 32, the plate 50 will be similarly adjusted vertically. The connecting means comprises a bolt 52 which passes through a hole 53 in the plate 51, through a vertically extended elongated slot 54 formed in the flat body 30" and then through a complementary aligned hole 55 formed in the plate 50.

Threaded onto the free end of the bolt 52 there is a wing nut 56 to be tightened against the rear face of the plate 50.

A peg 57 extends forward from the plate 50 and projects through the slot 54. The front end of the peg is extended through a complementary hole 58 formed in the front plate 51 to thereby retain the plates 50 and 51 from pivoting about the bolt 52 when the wing nut 56 is loosened.

A band 38' of elastic material, has one end knotted to the bust wire 35. The other end of the band 38' is passed slidably through the grommet 39 and has its other end knotted to the eye portion 50ª of the rear plate 50. The construction is such that as the plates 50 and 51 are adjusted vertically upward and downward along the length of the slot 54 the pivoted position of the bust wire 35 will be adjusted on the front of the flat body as desired to retain the bust wire in a position extended right angularly forward, as shown in Fig. 16 or 17, or in raised or lowered positions. However, the hook 32 and the bust wire 35 are free at all times to be collapsed against the front face of the flat body 30", as described in connection with the modification of the invention shown in Figs. 1 to 8.

The flat body 30" on opposite sides of the grommet 39 and above the pivoted ends of the bust wire 35 is formed with spaced vertically extended slots 60. Below the bust wire 35, the flat body 30" is formed along the vertical center thereof with an elongated slot 61 having short slits 62 extending in opposite directions from the ends thereof for rendering the material of the flat body on opposite sides of the slot 61 more resilient.

The slots 60 and 61 are provided for having the material of the dress suspended on the flat body 30" pressed thereinto for drawing the dress into position about the side edges of the flat body and across the front of the forwardly disposed bust wire 35.

In all other respects the form of the invention shown in Figs. 16 to 20 is similar to that described in connection with Figs. 1 to 8 and like reference numerals are used throughout to identify like parts.

The construction of the dress display form illustrated in Figs. 21 to 24 is in many respects similar to that illustrated in Figs. 16 to 20 differing only in the interconnection of the hook 32 and the bust wire 35 for adjusting the angular position of the bust wire on the front of the flat body 30".

The interconnection of Figs. 21 to 24 is characterized by a flat plate 70 which is positioned against the rear face of the flat body 30" over a vertically extended elongated slot 54. At its top edge, the flat plate 70 is formed with an upstanding eye portion 70ª into which the right angularly bent portion 32ª of the hook 32 is pivotally engaged.

The flat plate 70 is formed with a hole 71 aligned with the slot 54 and a bolt 72 is passed through the slot 54 and the hole 71 and has a wing nut 73 threaded on its free end to be tightened against the rear face of the plate 70 to hold the plate in desired adjusted positions. Extending from the front face of the plate 70 there is a peg 74 which projects into the slot 54 and retains the plate against pivotal movements about the bolt 72 as a pivot. The bust wire 35, as shown in Fig. 22, is M-shaped and a length of relatively stiff wire 75 has its front end 76 curled about an intermediate portion of the bust wire, see especially Fig. 23.

The rear end of the wire 75 is projected through a hole 77 formed in the flat body 30" on a line extending parallel to the pivotal axes of the pivotally mounted end portions of the bust wire. The hole 77 is reinforced with an oval shaped grommet 78 which has its greatest dimension extended vertically so that the wire 75 will have freedom of pivotal movement in a vertical plane.

An elongated stem portion 70ᵇ depends from the bottom edge of the plate 70 and is formed at its bottom end with a hole 79. The free rear end of the wire 75 where it projects from the grommet 78 is extended through the hole 79 in the stem portion 70ᵇ.

The construction is such that when the bolt 72 is loosened, the plate 70 can be moved upward and downward by the use of the hook 32. Such upward or downward movement of the plate 70 will cause the wire 75 to be pivoted so that its front end will move downward as the plate moves upward and to move upward as the plate 70 moves downward. Pivotal movement of the wire 75 will correspondingly pivot the bust wire 35 and adjust its angular position either upward or downward as required. When the desired adjusted position of the bust wire is achieved, the wing nut 73 is tightened to hold the plate 70 in its new position locking the bust wire 35 in the desired pivotally adjusted position.

In other respects the form of the invention shown in Figs. 21 to 24 is similar to that described in connection with Figs. 16 to 20 and like reference numerals are used to identify like parts in all of the views.

While I have illustrated and described the preferred embodiment of my invention, it is to be understood that I do not limit myself to the precise method herein disclosed and the right is reserved to all changes and modifications coming within the scope of the invention as defined in the appended claims.

Having thus described my invention, what I claim as new and desire to secure by United States Letters Patent is:

1. A dress display form comprising a flat solid body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said flat body having at least one elongate slot adjacent said bust wire for retaining excess portions of a dress draped thereon.

2. A dress display form comprising a flat solid body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said flat body having at least one elongate slot adjacent said bust wire for retaining excess portions of a dress draped thereon, said flat body being made of a rigid material.

3. A dress display form comprising a flat solid body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said flat body having at least one elongate slot adjacent said bust wire for retaining excess portions of a dress draped thereon, said supporting means for said flat body comprising a vertically extended hook having its lower end pivotally supported on said flat body.

4. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said pivotal mounting of said bust wire comprising outturned end portions on said bust wire, and U-shaped clips mounted on said flat body and in which said end portions are turnably engaged, said means for supporting said bust wire comprising a band having an intermediate portion engaged about said bust wire, a grommet mounted through said flat body above the pivot of said bust wire, said band having its ends slidably passed through said grommet, and a knot formed in the ends of said band after having been passed through said grommet.

5. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said pivotal mounting of said bust wire comprising outturned end portions on said bust wire, and U-shaped clips mounted on said flat body and in which said end portions are turnably engaged, said means for supporting said bust wire comprising a band having an intermediate portion engaged about said bust wire, a grommet mounted through said flat body above the pivot of said bust wire, said band having its ends slidably passed through said grommet, and a knot formed in the ends of said band after having been passed through said grommet, said band being of elastic material.

6. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said pivotal mounting of said bust wire comprising outturned end portions on said bust wire, coil springs engaged about said outturned end portions, said coil springs having one end anchored to said flat body, said coil springs having their other ends engaged behind said bust wire exerting a force turning said bust wire into a horizontal forwardly extended position.

7. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band.

8. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band, said band being formed of elastic material.

9. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band, said front plate having an upstanding eye portion, said flat body supporting means comprising a vertically extended hook having its bottom end pivotally engaged with said upstanding eye portion.

10. A dress display form comprising a flat body shaped to conform to the outline of the shoulder, chest and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band, said adjusting means comprising a bolt, said plates having aligned holes aligned with a vertically extended slot formed in said flat body, said bolt being passed through said aligned holes and slot, and a wing nut engaged on the free end of said bolt.

11. A dress display form comprising a flat body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band, said adjusting means comprising a bolt, said plates having aligned holes aligned with a vertically extended slot formed in said flat body, said bolt being passed through said aligned holes and slot, and a wing nut engaged on the free end of said bolt, and means for holding said plates from turning about said plates as an axis.

12. A dress display form comprising a flat body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising plates positioned against the front and rear faces of said flat body, said plates being interconnected through said body, a depending eye portion on the plate positioned against the rear face of said flat body, a band having one end secured to said bust wire and its other end passed slidably through said flat body above the pivot of said bust wire and secured to said depending eye portion, and means for adjusting the position of said plates vertically to draw on said band, said adjusting means comprising a bolt, said plates having aligned holes aligned with a vertically extended slot formed in said flat body, said bolt being passed through said aligned holes and slot, and a wing nut engaged on the free end of said bolt, and a peg projecting from one of said plates and throughout said slot, the other of said plates having a complementary hole into which said peg extends for holding said plates from turning about said bolt as an axis.

13. A dress display form comprising a flat body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising a flat plate positioned against the rear face of said flat body, a stiff wire having a front end curled about said bust wire intermediate of its sides, said flat body having a hole on a level with the pivotal axis of said bust wire, said wire having its rear end projected through said hole, a stem portion depending from said flat plate and connected to the rear end of said wire, and means for holding said flat plate in desired adjusted positions on said flat body.

14. A dress display form comprising a flat body shaped to conform to the outline of the shoulder, chest, hip and waist areas of the female body, means for supporting said flat body in a vertical position to have a dress draped therefrom, a preformed bust wire pivotally mounted at its ends on said body, and means for supporting said bust wire in a position extended horizontally from said body to shape the bust area of the dress mounted on said flat body, said bust wire supporting means being manually adjustable and comprising a flat plate positioned against the rear face of said flat body, a stiff wire having a front end curled about said bust wire intermediate of its sides, said flat body having a hole on a level with the pivotal axis of said bust wire, said wire having its rear end projected through said hole, a stem portion depending from said flat plate and connected to the rear end of said wire, and means for holding said flat plate in desired adjusted positions on said flat body, said holding means comprising a bolt, said flat body having a vertically extended elongated slot, said plate having a hole aligned with said slot, said bolt being passed through said slot and said hole, and a wing nut on the end of said bolt to be tightened against said plate.

NATHAN F. SCHILLING.

References Cited in the file of this patent
UNITED STATES PATENTS

| Number | Name | Date |
|---|---|---|
| 1,156,246 | Moschcowitz | Oct. 12, 1915 |
| 1,254,719 | Moschcowitz | Jan. 29, 1918 |
| 2,303,585 | Shafarman | Dec. 1, 1942 |
| 2,536,187 | Kosky et al. | Jan. 2, 1951 |